United States Patent
Vorbach et al.

(10) Patent No.: US 7,266,725 B2
(45) Date of Patent: Sep. 4, 2007

(54) METHOD FOR DEBUGGING RECONFIGURABLE ARCHITECTURES

(75) Inventors: Martin Vorbach, München (DE); Frank May, München (DE); Armin Nückel, Neupotz (DE)

(73) Assignee: Pact XPP Technologies AG, Munich (DE)

( * ) Notice: Subject to any disclaimer, the term of this patent is extended or adjusted under 35 U.S.C. 154(b) by 330 days.

(21) Appl. No.: 09/967,497

(22) Filed: Sep. 28, 2001

(65) Prior Publication Data

US 2003/0046607 A1 Mar. 6, 2003

(30) Foreign Application Priority Data

Sep. 3, 2001 (DE) .................. 101 42 904
Sep. 11, 2001 (DE) .................. 101 44 733

(51) Int. Cl.
G06F 11/00 (2006.01)
(52) U.S. Cl. .......................... 714/25; 714/38
(58) Field of Classification Search ............... 714/25, 714/30, 31, 33, 39, 734, 733, 38; 713/100; 712/227; 717/124
See application file for complete search history.

(56) References Cited

U.S. PATENT DOCUMENTS

| | | |
|---|---|---|
| 2,067,477 A | 1/1937 | Cooper |
| 3,242,998 A | 3/1966 | Gubbins |
| 3,681,578 A | 8/1972 | Stevens |
| 3,757,608 A | 9/1973 | Willner |

(Continued)

FOREIGN PATENT DOCUMENTS

DE 42 21 278 1/1994

(Continued)

OTHER PUBLICATIONS

Ye, Z.A. et al., "A C Compiler for a Processor with a Reconfigurable Functional Unit," FPGA 2000 ACM/SIGNA International Symposium on Field Programmable Gate Arrays, Monterey, CA Feb. 9-11, 2000, pp. 95-100.

(Continued)

*Primary Examiner*—Dieu-Minh Le
(74) *Attorney, Agent, or Firm*—Kenyon & Kenyon LLP

(57) ABSTRACT

A method for efficiently debugging a program defining a plurality of configurations to be successively processed on a dynamically reconfigurable architecture including a plurality of logic elements cooperating with each other. The method includes storing data in a memory in a configuration-conforming manner, the data generated by executing a configuration forming part of the program on the reconfigurable architecture, and including algorithmically relevant state data of the program that is associated with at least one of the configurations. The method further includes subsequently continuing execution of the program, the execution including a reconfiguration, and detecting an error based on stored state data, wherein for each state for which corresponding state data is to be stored, the state remains unchanged at least until the corresponding state data is stored. For obtaining a particular state data, the method interrupts execution of the program by configuring a first configuration via which the particular state data is transmitted to a debugging unit instead of a second configuration that is a next-required configuration of the program; and subsequent to obtaining the particular state data, resumes execution of the program by configuring the second configuration.

5 Claims, 3 Drawing Sheets

U.S. PATENT DOCUMENTS

| | | |
|---|---|---|
| 3,855,577 A | 12/1974 | Vandierendonck |
| 4,498,172 A | 2/1985 | Bhavsar |
| 4,566,102 A | 1/1986 | Hefner |
| 4,591,979 A | 5/1986 | Iwashita |
| 4,663,706 A | 5/1987 | Allen et al. |
| 4,682,284 A | 7/1987 | Schrofer |
| 4,706,216 A | 11/1987 | Carter |
| 4,720,780 A | 1/1988 | Dolecek |
| 4,739,474 A | 4/1988 | Holsztynski |
| 4,761,755 A | 8/1988 | Ardini et al. |
| 4,811,214 A | 3/1989 | Nosenchuck et al. |
| 4,852,043 A | 7/1989 | Guest |
| 4,852,048 A | 7/1989 | Morton |
| 4,860,201 A | 8/1989 | Stolfo et al. |
| 4,870,302 A | 9/1989 | Freeman |
| 4,891,810 A | 1/1990 | de Corlieu et al. |
| 4,901,268 A | 2/1990 | Judd |
| 4,910,665 A | 3/1990 | Mattheyses et al. |
| 4,967,340 A | 10/1990 | Dawes |
| 5,014,193 A | 5/1991 | Garner et al. |
| 5,015,884 A | 5/1991 | Agrawal et al. |
| 5,021,947 A | 6/1991 | Campbell et al. |
| 5,023,775 A | 6/1991 | Poret |
| 5,043,978 A | 8/1991 | Nagler et al. |
| 5,047,924 A | 9/1991 | Fujioka et al. |
| 5,065,308 A | 11/1991 | Evans |
| 5,072,178 A | 12/1991 | Matsumoto |
| 5,081,375 A | 1/1992 | Pickett et al. |
| 5,109,503 A | 4/1992 | Cruickshank et al. |
| 5,113,498 A | 5/1992 | Evan et al. |
| 5,115,510 A | 5/1992 | Okamoto et al. |
| 5,123,109 A | 6/1992 | Hillis |
| 5,125,801 A | 6/1992 | Nabity et al. |
| 5,128,559 A | 7/1992 | Steele |
| 5,142,469 A | 8/1992 | Weisenborn |
| 5,144,166 A | 9/1992 | Camarota et al. |
| 5,193,202 A | 3/1993 | Jackson et al. |
| 5,203,005 A | 4/1993 | Horst |
| 5,204,935 A | 4/1993 | Mihara et al. |
| 5,208,491 A | 5/1993 | Ebeling et al. |
| 5,226,122 A | 7/1993 | Thayer et al. |
| RE34,363 E | 8/1993 | Freeman |
| 5,233,539 A | 8/1993 | Agrawal et al. |
| 5,247,689 A | 9/1993 | Ewert |
| 5,274,593 A | 12/1993 | Proebsting |
| 5,287,472 A | 2/1994 | Horst |
| 5,294,119 A | 3/1994 | Vincent et al. |
| 5,301,284 A | 4/1994 | Estes et al. |
| 5,301,344 A | 4/1994 | Kolchinsky |
| 5,303,172 A | 4/1994 | Magar et al. |
| 5,336,950 A | 8/1994 | Popli et al. |
| 5,347,639 A | 9/1994 | Rechtschaffen et al. |
| 5,349,193 A | 9/1994 | Mott et al. |
| 5,353,432 A | 10/1994 | Richek et al. |
| 5,361,373 A | 11/1994 | Gilson |
| 5,379,444 A | 1/1995 | Mumme |
| 5,410,723 A | 4/1995 | Schmidt et al. |
| 5,418,952 A | 5/1995 | Morley et al. |
| 5,421,019 A | 5/1995 | Holsztynski et al. |
| 5,422,823 A | 6/1995 | Agrawal et al. |
| 5,425,036 A | 6/1995 | Liu et al. |
| 5,426,378 A | 6/1995 | Ong |
| 5,428,526 A | 6/1995 | Flood et al. |
| 5,430,687 A | 7/1995 | Hung et al. |
| 5,440,245 A | 8/1995 | Galbraith et al. |
| 5,440,538 A | 8/1995 | Olsen |
| 5,442,790 A | 8/1995 | Nosenchuck |
| 5,444,394 A | 8/1995 | Watson et al. |
| 5,448,186 A | 9/1995 | Kawata |
| 5,455,525 A | 10/1995 | Ho et al. |
| 5,457,644 A | 10/1995 | McCollum |
| 5,465,375 A | 11/1995 | Thepaut et al. |
| 5,473,266 A | 12/1995 | Ahanin et al. |
| 5,473,267 A | 12/1995 | Stansfield |
| 5,475,583 A | 12/1995 | Bock et al. |
| 5,475,803 A | 12/1995 | Stearns et al. |
| 5,475,856 A | 12/1995 | Kogge |
| 5,483,620 A | 1/1996 | Pechanek et al. |
| 5,485,103 A | 1/1996 | Pedersen et al. |
| 5,485,104 A | 1/1996 | Agrawal et al. |
| 5,489,857 A | 2/1996 | Agrawal et al. |
| 5,491,353 A | 2/1996 | Kean |
| 5,493,239 A | 2/1996 | Zlotnick |
| 5,497,498 A | 3/1996 | Taylor |
| 5,506,998 A | 4/1996 | Kato et al. |
| 5,510,730 A | 4/1996 | El Gamal et al. |
| 5,511,173 A | 4/1996 | Yamaura et al. |
| 5,513,366 A | 4/1996 | Agarwal et al. |
| 5,521,837 A | 5/1996 | Frankle et al. |
| 5,522,083 A | 5/1996 | Gove et al. |
| 5,530,873 A | 6/1996 | Takano |
| 5,530,946 A | 6/1996 | Bouvier et al. |
| 5,532,693 A | 7/1996 | Winters et al. |
| 5,532,957 A | 7/1996 | Malhi |
| 5,535,406 A | 7/1996 | Kolchinsky |
| 5,537,057 A | 7/1996 | Leong et al. |
| 5,537,601 A | 7/1996 | Kimura et al. |
| 5,541,530 A | 7/1996 | Cliff et al. |
| 5,544,336 A | 8/1996 | Kato et al. |
| 5,548,773 A | 8/1996 | Kemeny et al. |
| 5,555,434 A | 9/1996 | Carlstedt |
| 5,559,450 A | 9/1996 | Ngai et al. |
| 5,561,738 A | 10/1996 | Kinerk et al. |
| 5,570,040 A | 10/1996 | Lytle et al. |
| 5,574,930 A | 11/1996 | Halverson, Jr. et al. |
| 5,583,450 A | 12/1996 | Trimberger et al. |
| 5,586,044 A | 12/1996 | Agrawal et al. |
| 5,587,921 A | 12/1996 | Agrawal et al. |
| 5,588,152 A | 12/1996 | Dapp et al. |
| 5,590,345 A | 12/1996 | Barker et al. |
| 5,590,348 A | 12/1996 | Phillips et al. |
| 5,596,742 A | 1/1997 | Agarwal et al. |
| 5,600,265 A | 2/1997 | El Gamal et al. |
| 5,611,049 A | 3/1997 | Pitts |
| 5,617,547 A | 4/1997 | Feeney et al. |
| 5,625,806 A | 4/1997 | Kromer |
| 5,634,131 A | 5/1997 | Matter et al. |
| 5,649,176 A | 7/1997 | Selvidge et al. |
| 5,649,179 A | 7/1997 | Steenstra et al. |
| 5,652,894 A | 7/1997 | Hu et al. |
| 5,655,069 A | 8/1997 | Ogawara et al. |
| 5,655,124 A | 8/1997 | Lin |
| 5,657,330 A | 8/1997 | Matsumoto |
| 5,659,797 A | 8/1997 | Zandveld et al. |
| 5,675,743 A | 10/1997 | Mavity |
| 5,680,583 A | 10/1997 | Kuijsten |
| 5,713,037 A | 1/1998 | Wilkinson et al. |
| 5,717,943 A | 2/1998 | Barker et al. |
| 5,732,209 A | 3/1998 | Vigil et al. |
| 5,734,921 A | 3/1998 | Dapp et al. |
| 5,742,180 A | 4/1998 | DeHon et al. |
| 5,748,872 A | 5/1998 | Norman |
| 5,754,827 A | 5/1998 | Barbier et al. |
| 5,754,871 A | 5/1998 | Wilkinson et al. |
| 5,760,602 A | 6/1998 | Tan |
| 5,761,484 A | 6/1998 | Agarwal et al. |
| 5,773,994 A | 6/1998 | Jones |
| 5,778,439 A | 7/1998 | Trimberger et al. |
| 5,784,636 A | 7/1998 | Rupp |
| 5,794,059 A | 8/1998 | Barker et al. |
| 5,794,062 A | 8/1998 | Baxter |
| 5,801,715 A | 9/1998 | Norman |
| 5,802,290 A | 9/1998 | Casselman |
| 5,828,229 A | 10/1998 | Cliff et al. |

| | | | | | | |
|---|---|---|---|---|---|---|
| 5,828,858 | A | 10/1998 | Athanas et al. | 6,421,817 | B1 | 7/2002 | Mohan et al. |
| 5,838,165 | A | 11/1998 | Chatter | 6,425,068 | B1 | 7/2002 | Vorbach et al. |
| 5,844,888 | A | 12/1998 | Narjjyka | 6,434,695 | B1 * | 8/2002 | Esfahani et al. ............... 713/2 |
| 5,848,238 | A | 12/1998 | Shimomura et al. | 6,457,116 | B1 | 9/2002 | Mirsky et al. |
| 5,854,918 | A | 12/1998 | Baxter | 6,477,643 | B1 | 11/2002 | Vorbach et al. |
| 5,859,544 | A | 1/1999 | Norman | 6,480,937 | B1 | 11/2002 | Vorbach et al. |
| 5,865,239 | A | 2/1999 | Carr | 6,480,954 | B2 | 11/2002 | Trimberger et al. |
| 5,867,691 | A | 2/1999 | Shiraishi | 6,513,077 | B2 | 1/2003 | Vorbach et al. |
| 5,867,723 | A | 2/1999 | Chin et al. | 6,519,674 | B1 | 2/2003 | Lam et al. |
| 5,884,075 | A | 3/1999 | Hester et al. | 6,526,520 | B1 | 2/2003 | Vorbach et al. |
| 5,887,162 | A | 3/1999 | Williams et al. | 6,538,468 | B1 | 3/2003 | Moore |
| 5,889,982 | A | 3/1999 | Rodgers et al. | 6,539,438 | B1 * | 3/2003 | Ledzius et al. ............... 710/8 |
| 5,892,370 | A | 4/1999 | Eaton et al. | 6,539,477 | B1 | 3/2003 | Seawright |
| 5,892,961 | A | 4/1999 | Trimberger | 6,542,844 | B1 * | 4/2003 | Hanna ....................... 702/120 |
| 5,901,279 | A | 5/1999 | Davis, III | 6,542,998 | B1 | 4/2003 | Vorbach et al. |
| 5,915,123 | A | 6/1999 | Mirsky et al. | 6,571,381 | B1 | 5/2003 | Vorbach et al. |
| 5,924,119 | A | 7/1999 | Sindhu et al. | 6,587,939 | B1 | 7/2003 | Takano |
| 5,927,423 | A | 7/1999 | Wada et al. | 6,657,457 | B1 | 12/2003 | Hanrahan et al. |
| 5,933,642 | A | 8/1999 | Greenbaum et al. | 6,687,788 | B2 | 2/2004 | Vorbach et al. |
| 5,936,424 | A | 8/1999 | Young et al. | 6,697,979 | B1 | 2/2004 | Vorbach et al. |
| 5,943,242 | A | 8/1999 | Vorbach et al. | 6,757,847 | B1 * | 6/2004 | Farkash et al. ............... 714/39 |
| 5,956,518 | A | 9/1999 | DeHon et al. | 6,785,826 | B1 | 8/2004 | Durham et al. |
| 5,966,534 | A | 10/1999 | Cooke et al. | 6,802,026 | B1 * | 10/2004 | Patterson et al. ............ 714/35 |
| 5,970,254 | A | 10/1999 | Cooke et al. | 2001/0010074 | A1 | 7/2001 | Nishihara et al. |
| 5,996,083 | A | 11/1999 | Gupta et al. | 2002/0038414 | A1 | 3/2002 | Taylor et al. |
| 6,011,407 | A | 1/2000 | New | 2002/0143505 | A1 | 10/2002 | Drusinsky |
| 6,014,509 | A | 1/2000 | Furtek et al. | 2002/0144229 | A1 | 10/2002 | Hanrahan |
| 6,021,490 | A * | 2/2000 | Vorbach et al. ............ 713/100 | 2002/0165886 | A1 | 11/2002 | Lam |
| 6,023,564 | A | 2/2000 | Trimberger | 2003/0014743 | A1 | 1/2003 | Cooke et al. |
| 6,023,742 | A | 2/2000 | Ebeling et al. | 2003/0046607 | A1 | 3/2003 | Vorbach |
| 6,034,538 | A | 3/2000 | Abramovici | 2003/0052711 | A1 | 3/2003 | Taylor et al. |
| 6,038,650 | A | 3/2000 | Vorbach et al. | 2003/0055861 | A1 | 3/2003 | Lai et al. |
| 6,038,656 | A | 3/2000 | Martin et al. | 2003/0056085 | A1 | 3/2003 | Vorbach |
| 6,047,115 | A | 4/2000 | Mohan et al. | 2003/0056091 | A1 | 3/2003 | Greenberg |
| 6,049,222 | A | 4/2000 | Lawman | 2003/0056202 | A1 | 3/2003 | Vorbach |
| 6,052,773 | A | 4/2000 | DeHon et al. | 2003/0093662 | A1 | 5/2003 | Vorbach et al. |
| 6,054,873 | A | 4/2000 | Laramie | 2003/0097513 | A1 | 5/2003 | Vorbach et al. |
| 6,058,469 | A | 5/2000 | Baxter | 2003/0123579 | A1 | 7/2003 | Safavi et al. |
| 6,081,903 | A | 6/2000 | Vorbach et al. | 2003/0135686 | A1 | 7/2003 | Vorbach et al. |
| 6,085,317 | A | 7/2000 | Smith | 2003/0192032 | A1 * | 10/2003 | Andrade et al. ............ 717/124 |
| 6,088,795 | A * | 7/2000 | Vorbach et al. ............ 713/100 | 2004/0015899 | A1 | 1/2004 | May et al. |
| 6,092,174 | A | 7/2000 | Roussakov | 2004/0025005 | A1 | 2/2004 | Vorbach et al. |
| 6,105,105 | A | 8/2000 | Trimberger | | | | |
| 6,108,760 | A | 8/2000 | Mirsky et al. | | | | |

FOREIGN PATENT DOCUMENTS

| | | |
|---|---|---|
| DE | 44 16 881 | 11/1994 |
| DE | 196 51 075 | 6/1998 |
| DE | 196 54 593 | 7/1998 |
| DE | 196 54 595 | 7/1998 |
| DE | 196 54 846 | 7/1998 |
| DE | 197 04 044 | 8/1998 |
| DE | 197 04 728 | 8/1998 |
| DE | 197 04 742 | 9/1998 |
| DE | 198 07 872 | 8/1999 |
| DE | 198 61 088 | 2/2000 |
| DE | 199 26 538 | 12/2000 |
| DE | 100 28 397 | 12/2001 |
| DE | 100 36 627 | 2/2002 |
| DE | 101 29 237 | 4/2002 |
| DE | 102 04 044 | 8/2003 |
| EP | 0 221 360 | 5/1987 |
| EP | 0 428 327 | 5/1991 |
| EP | 0 463 721 | 1/1992 |
| EP | 0 477 809 | 4/1992 |
| EP | 0 485 690 | 5/1992 |
| EP | 0 427 029 | 8/1992 |
| EP | 0 497 029 | 8/1992 |
| EP | 0 539 595 | 5/1993 |
| EP | 0 628 917 | 12/1994 |
| EP | 0 678 985 | 10/1995 |
| EP | 0 686 915 | 12/1995 |
| EP | 0 707 269 | 4/1996 |
| EP | 0 726 532 | 8/1996 |

Additional entries (left column continued):

| | | | |
|---|---|---|---|
| 6,119,181 | A | 9/2000 | Vorbach et al. |
| 6,122,719 | A | 9/2000 | Mirsky et al. |
| 6,125,408 | A | 9/2000 | McGee et al. |
| 6,127,908 | A | 10/2000 | Bozler et al. |
| 6,172,520 | B1 | 1/2001 | Lawman et al. |
| 6,202,182 | B1 | 3/2001 | Abramovici et al. |
| 6,219,833 | B1 | 4/2001 | Solomon et al. |
| 6,230,307 | B1 * | 5/2001 | Davis et al. ................. 716/16 |
| 6,243,808 | B1 | 6/2001 | Wang |
| 6,260,179 | B1 | 7/2001 | Ohsawa et al. |
| 6,263,430 | B1 | 7/2001 | Trimberger et al. |
| 6,279,077 | B1 | 8/2001 | Nasserbakht et al. |
| 6,282,627 | B1 | 8/2001 | Wong et al. |
| 6,288,566 | B1 | 9/2001 | Hanrahan et al. |
| 6,289,440 | B1 | 9/2001 | Casselman |
| 6,298,472 | B1 | 10/2001 | Phillips et al. |
| 6,311,200 | B1 | 10/2001 | Hanrahan et al. |
| 6,321,366 | B1 | 11/2001 | Tseng et al. |
| 6,321,373 | B1 | 11/2001 | Ekanadham et al. |
| 6,338,106 | B1 | 1/2002 | Vorbach et al. |
| 6,341,318 | B1 | 1/2002 | Dakhil |
| 6,347,346 | B1 | 2/2002 | Taylor |
| 6,349,346 | B1 | 2/2002 | Hanrahan et al. |
| 6,370,596 | B1 | 4/2002 | Dakhil |
| 6,378,068 | B1 | 4/2002 | Foster et al. |
| 6,389,379 | B1 | 5/2002 | Lin et al. |
| 6,389,579 | B1 | 5/2002 | Phillips et al. |
| 6,392,912 | B1 | 5/2002 | Hanrahan et al. |
| 6,405,299 | B1 | 6/2002 | Vorbach et al. |

| | | |
|---|---|---|
| EP | 0 735 685 | 10/1996 |
| EP | 0 835 685 | 10/1996 |
| EP | 0 748 051 | 12/1996 |
| EP | 0 726 532 | 7/1998 |
| EP | 0 926 594 | 6/1999 |
| EP | 1 102 674 | 7/1999 |
| EP | 1 146 432 | 10/2001 |
| JP | 58-58672 | 4/1983 |
| JP | 2-130023 | 5/1990 |
| JP | 2-226423 | 9/1990 |
| JP | 5-276007 | 10/1993 |
| JP | 7-154242 | 6/1995 |
| JP | 8-44581 | 2/1996 |
| JP | 8-250685 | 9/1996 |
| WO | WO90/04835 | 5/1990 |
| WO | WO90/11648 | 10/1990 |
| WO | WO93/11503 | 6/1993 |
| WO | WO94/08399 | 4/1994 |
| WO | WO95/00161 | 1/1995 |
| WO | WO95/26001 | 9/1995 |
| WO | WO98/26356 | 6/1998 |
| WO | WO98/28697 | 7/1998 |
| WO | WO98/29952 | 7/1998 |
| WO | WO98/31102 | 7/1998 |
| WO | WO98/35299 | 8/1998 |
| WO | WO99/00731 | 1/1999 |
| WO | WO99/00739 | 1/1999 |
| WO | WO99/12111 | 3/1999 |
| WO | WO99/32975 | 7/1999 |
| WO | WO99/40522 | 8/1999 |
| WO | WO99/44120 | 9/1999 |
| WO | WO99/44147 | 9/1999 |
| WO | WO00/17771 | 3/2000 |
| WO | WO00/77652 | 12/2000 |
| WO | WO 01/55917 | 8/2001 |
| WO | WO02/13000 | 2/2002 |
| WO | WO02/21010 | 3/2002 |
| WO | WO02/29600 | 4/2002 |
| WO | WO02/071248 | 9/2002 |
| WO | WO02/071249 | 9/2002 |
| WO | WO02/103532 | 12/2002 |
| WO | WO03/017095 | 2/2003 |
| WO | WO03/023616 | 3/2003 |
| WO | WO03/025781 | 3/2003 |
| WO | WO03/032975 | 4/2003 |
| WO | WO03/036507 | 5/2003 |

OTHER PUBLICATIONS

Ling, X., "WASMII: An MPLD with Data-Driven Control on a Virtual Hardware," Journal of Supercomputing, Kluwer Academic Publishers, Dordrecht, Netherlands, 1995, pp. 253-276.

Villasensor, J. et al., "Express Letters Video Communications Using Rapidly Reconfigurable Hardware," Transactions on Circuits and Systems for Video Technology, IEEE, Inc. NY, Dec. 1995, pp. 565-567.

Hedge, S.J., 3D WASP Devices for On-line Signal and Data Processing, 1994, International Conference on Wafer Scale Integration, pp. 11-21.

Iseli, C., et al. "A C++ Compiler for FPGA Custom Execution Units Synthesis," IEEE. 1995, pp. 173-179.

Alippi, C., et al., Determining the Optimum Extended Instruction Set Architecture for Application Specific Reconfigurable VLIW CPUs, IEEE., 2001, pp. 50-56.

Dutt, Nikil et al., If Software is King for Systems-on-Silicon, What's New in Compiler?, IEEE., 1997, pp. 322-325.

Athanas, Peter "A Functional Reconfigurable Architecture and Compiler for Adaptive Computing," IEEE. 1993, pp. 49-55.

Arabi et al., "PLD Integrates Dedicated High-speed Data Buffering, Complex State Machine, and Fast Decode Array," conference record on WESCON '98, Sep. 28, 1993, pp. 432-436.

Ade et al., "Minimum Memory Buffers in DSP Applications," Electronics Letters, vol. 30, No. 6, Mar. 17, 1994, pp. 469-471.

Villasenor, John et al., "Configurable Computing," *Scientific American*, vol. 276, No. 6, Jun. 1997, pp. 66-71.

Villasenor, John et al., "Configurable Computing Solutions for Automatic Target Recognition," *IEEE*, 1996 pp. 70-79.

Tau, Edward et al., "A First Generation DPGA Implementation," *FPD'95*, pp. 138-143.

Athanas, Peter et al., "Quantitative analysis of floating point arithmetic on FPGA based custom computing machines," IEEE Symposium on FPGAs For Custom Computing Machines, *IEEE Computing Society Press*, Apr. 19-21, 1995, pp. i-vii, 1-222.

Athanas, Peter et al., "An Adaptive Hardware Machine Architecture and Compiler for Dynamic Processor Reconfiguration", IEEE, Laboratory for Engineering Man/Machine Systems Division of Engineering, Box D, Brown University Providence, Rhode Island, 1991, pp. 397-400.

Bittner, Ray A. Jr., "Wormhole Run-time Reconfiguration: Conceptualization and VLSI Design of a High Performance Computing System," *Dissertation*, Jan. 23, 1997, pp. I-XX, 1-415.

Myers, G. "Advances in Computer Architecture," Wiley-Interscience Publication, 2nd ed., John Wiley & Sons, Inc. pp. 463-494, 1978.

M. Saleeba, "A Self-Contained Dynamically Reconfigurable Processor Architecture," Sixteenth Australian Computer Science Conference, ASCS-16, QLD, Australia, Feb. 1993.

M. Morris Mano, "Digital Design," by Prentice Hall, Inc., Englewood Cliffs, New Jersey 07632, 1984, pp. 119-125, 154-161.

Maxfield, C. "Logic that Mutates While-U-Wait" EDN (Bur. Ed) (USA), EDN (European Edition), Nov. 7, 1996, Cahners Publishing, USA.

Norman, Richard S., "Hyperchip Business Summary, The Opportunity," Jan. 31, 2000, pp. 1-3.

Ferrante J. et al., "The Program Dependence Graph and its Use in Optimization ACM Transactions on Programming Languages and Systems," Jul. 1987, USA, [online] Bd. 9, Nr., 3, pp. 319-349, XP002156651 ISSN: 0164-0935 ACM Digital Library.

Hwang L. et al., "Min-cut Replication in Partitioned Networks" IEEE Transactions on Computer-Aided Design of Integrated Circuits and Systems, [online] Bd. 14, Nr. 1, Jan. 1995, pp. 96-106, XP00053228 USA ISSN: 0278-0070 IEEE Xplore.

Baumgarte, V., et al., PACT XPP "A Self-reconfigurable Data Processing Architecture," PACT Info. GMBH, Munchen Germany 2001.

Jantsch, Axel et al., "A Case Study on Hardware/software Partitioning," Royal Institute of Technology, Kista, Sweden, Apr. 10, 1994 IEEE, pp. 111-118.

Becker, J. et al., "Parallelization in Co-compilation for Configurable Accelerators—a Host/accelerator Partitioning Compilation Method," proceedings of Asia and South Pacific Design Automation Conference, Yokohama, Japan, Feb. 10-13, 1998.

Isshiki, Tsuyoshi et al., "Bit-Serial Pipeline Synthesis for Multi-FPGA Systems with C++ Design Capture," 1996 IEEE, pp. 38-47.

Weinhardt, Markus, "Ubersetzingsmethoden fur strukturprogrammierbare rechner," Dissertation for Doktors der Ingenieurwissenschaften der Universitat Karlsruhe: Jul. 1, 1997.

Hammes, Jeff et al., "Cameron: High Level Language Compilation for Reconfigurable Systems," Department of Computer Science, Colorado State University, Conference on Parallel Architectures and Compilation Techniques, Oct. 12-16, 1999.

K. Wada et al., "A Performance Evaluation of Tree-based Coherent Distributed Shared Memory" Proceedings of the Pacific RIM Conference on Communications, Comput and Signal Processing, Victoria, May 19-21, 1993.

Nilsson et al., "The Scalable Tree Protocol—A Cache Conherence Approaches for Large-Scale Multiprocessors" IEEE, pp. 498-506 Dec. 1992.

Wu et al., "A New Cache Directory Scheme", IEEE, pp. 466-472, Jun. 1996.

Hauck "The Roles of FPGA's in Reprogrammable Systems," IEEE, Apr. 1998, pp. 615-638.

Wittig et al., "OneChip: An FPGA Processor with Reconfigurable Logic" IEEE, 1996 pp. 126-135.

Cadambi et al., "Managing Pipeline-reconfigurable FPGAs," ACM, 1998, pp. 55-64.

Hong Yu Xu et al., "Parallel QR Factorization on a Block Data Flow Architecture" Conference Proceeding Article, Mar. 1, 1992, pp. 332-336 XPO10255276, p. 333, Abstract 2.2, 2.3, 2.4—p. 334.

Mirsky, E. DeHon, "MATRIX: A Reconfigurable Computing Architecture with Configurable Instruction Distribution and Deployable Resources," Proceedings of the IEEE Symposium on FPGAs for Custom Computing Machines, 1996, pp. 157-1666.

Weinhardt, M. "Compilation Methods for Structure-programmable Computers", dissertation, ISBN 3-89722-011-3, 1997.

Cardoso, J.M.P., "Compilation of Java™ Algorithms onto Reconfigurable Computing Systems with Exploitation of Operation-Level Parallelism," Ph.D. Thesis, Universidade Tecnica de Lisboa (UTL), Lisbon, Portugal Oct. 2000 (English Abstract included).

Kung, "Deadlock Avoidance for Systolic Communication", 1988 Conference Proceedings of 15th Annual International Symposium on Computer Architecture, May 30, 1988, pp. 252-260.

TMS320C54X DSP: CPU and Peripherals, Texas Instruments, 1996, pp. 6-26 to 6-46.

TMS320C54x DSP: Mnemonic Instruction Set, Texas Instruments, 1996, p. 4-64.

Xlinx, "Logic Cell Array Families: XC4000, XC4000A and XC4000H", product description, pp. 2-7 to 2-15, Additional XC3000, XC31000 and XC3100A Data, pp. 8-16 and 9-14.

Miller, Michael J. et al., "High-Speed FIFOs Contend with Widely Differing Data Rates: Dual-port RAM Buffer and Dual-pointer System Provide Rapid, High-density Data Storage and Reduce Overhead", Computer Design, Sep. 1, 1985, pp. 83-86.

Forstner, Peter "Wer Zuerst Kommt, Mahlt Zuerst!: Teil 3: Einsatzgebiete und Anwendungsbeispiele von FIFO-Speichern", Elektronik, Aug. 2000, pp. 104-109.

John R. Hauser et al., "Garp: A MIPS Processor with a Reconfigurable Coprocessor", University of California, Berkeley, IEEE, 1997, pp. 12-21.

Jorg Donandt, "Improving Response Time of Programmable Logic Controllers by Use of a Boolean Coprocessor", AEG Research Institute Berlin, IEEE, 1989, pp. 4-167-4-169.

Alexandre F. Tenca et al., "A Variable Long-Precision Arithemtic Unit Design for Reconfigurable Coprocessor Architectures", University of California, Los Angeles, 1998, pp. 216-225.

Andreas Koch et al, "Practical Experiences with the SPARXIL Co-Processor", 1998, IEEE, pp. 394-398.

Gokhale M. B. et al., "Automatic Allocation of Arrays to Memories in FPGA processors with Multiple Memory Banks", Field-Programmable Custom Computing Machines, 1999, IEEE, pp. 63-67.

Christian Siemers, "Rechenfabrik Ansaetze Fuer Extrem Parallele Prozessoren", Verlag Heinze Heise GmbH., Hannover, DE No. 15, Jul. 16, 2001, pp. 170-179.

Pedro Diniz et al., "Automatic Synthesis of Data Storage and Control Structures for FPGA-based Computing Engines", 2000, IEEE, pp. 91-100.

Markus Weinhardt et al., "Pipeline Vectorization for Reconfigurable Systems", 1999, IEEE, pp. 52-60.

Lizy John et al., "A Dynamically Reconfigurable Interconnect for Array Processors", vol. 6, No. 1, Mar. 1998, IEEE, pp. 150-157.

Fineberg, Samuel et al., "Experimental Analysis of a Mixed-Mode Parallel Architecture Using Bitonic Sequence Sorting", vol. 11, No. 3, Mar. 1991, pp. 239-251.

Jacob, Jeffrey et al., "Memory Interfacing and Instruction Specification for Reconfigurable Processors", ACM 1999, pp. 145-154.

Baumgarte, V., et al., PACT XPP "A Self-reconfigurable Data Processing Architecture," PACT Info. GMBH, Munchen Germany, 2001, 7 pages.

Beck et al., "From control flow to data flow," TR 89-1050, Oct. 1989, Dept. of Computer Science, Cornell University, Ithaca, NY, pp. 1-25.

Becker, J. et al., "Parallelization in Co-compilation for Configurable Accelerators—a Host/accelerator Partitioning Compilation Method," proceedings of Asia and South Pacific Design Automation Conference, Yokohama, Japan, Feb. 10-13, 1998, 11 pages.

Cardoso, J.M.P., "Compilation of Java™ Algorithms onto Reconfigurable Computing Systems with Exploitation of Operation-Level Parallelism," Ph.D. Thesis, Universidade Tecnica de Lisboa (UTL), Lisbon, Portugal Oct. 2000 (Table of Contents and English Abstract only).

Hammes, Jeff et al., "Cameron: High Level Language Compilation for Reconfigurable Systems," Department of Computer Science, Colorade State University, Conference on Parallel Architectures and Compilation Techniques, Oct. 12-16, 1999, 9 pages.

Hauser, J.R. et al., "Garp: A MIPS Processor with a Reconfigurable Coprocessor", University of California, Berkeley, IEEE, 1997, pp. 24-33.

Koch, et al, "Practical Experiences with the SPARXIL Co-Processor", 1998, IEEE, pp. 394-398.

Ling et al., "WASMII: An MPLD with Data-Driven Control on a Virtual Hardware," Journal of Supercomputing, Kluwer Academic Publishers, Dordrecht, Netherlands, 1995, pp. 253-276.

Ling et al., "WASMII: A Multifunction Programmable Logic Device (MPLD) with Data Driven Control," The Transactions of the Institute of Electronics, Information and Communication Engineers, Apr. 25, 1994, vol. J77-D-1, Nr. 4, pp. 309-317. [This references is in Chinese, but should be comparable in content to the Ling et al. reference above].

Maxfield, C., "Logic That Mutates While-U-Wait," EDN (Bur. Ed.) USA, EDN (European Edition), Nov. 7, 1996, Cahners Publishing, USA, pp. 137-140, 142.

Myers, G. "Advances in Computer Architecture," Wiley-Interscience Publication, 2nd ed., John Wiley & Sons, Inc. , 1978, pp. 463-494.

Mirsky, E. et al, "MATRIX: A Reconfigurable Computing Architecture with Configurable Instruction Distribution and Deployable Resources," Proceedings of the IEEE Symposium on FPGAs for Custom Computing Machines, 1996, pp. 157-166.

Shirazi, et al., "Quantitative analysis of floating point arithmetic on FPGA based custom computing machines," IEEE Symposium on FPGAs for Custom Computing Machines, *IEEE Computer Society Press*, Apr. 19-21, 1995, pp. 155-162.

Sueyoshi, T, "Present Status and Problems of the Reconfigurable Computing Systems Toward the Computer Evolution," Department of Artificial Intelligence, Kyushi Institute of Technology, Fukuoka, Japan; Institute of Electronics, Information and Communication Engineers, vol. 96, No. 426, IEICE Technical Report (1996), pp. 111-119 [English Abstract Only].

Wada et al., "A Performance Evaluation of Tree-based Coherent Distributed Shared Memory" Proceedings of the Pacific RIM Conference on Communications, Comput and Signal Processing, Victoria, May 19-21, 1993, pp. 390-393.

Weinhardt, Markus et al., "Pipeline Vectorization," IEEE Transactions on Computer-Aided Design of Integrated Circuits and Systems, vol. 20, No. 2, Feb. 2001, pp. 234-248.

Ye, Z.A. et al., "A Compiler for a Processor With A Reconfigurable Functional Unit," FPGA 2000 ACM/SIGNA International Symposium on Field Programmable Gate Arrays, Monterey, CA Feb. 9-11, 2000, pp. 95-100.

* cited by examiner

METHOD FOR DEBUGGING RECONFIGURABLE ARCHITECTURES

FIELD OF THE INVENTION

The present invention relates to methods for debugging programs on configurable architectures.

BACKGROUND INFORMATION

A reconfigurable architecture includes chips (VPU) with configurable function and/or networking, particularly integrated chips with a multiplicity of arithmetic and/or logic and/or analog and/or storing and/or networking modules arranged one-dimensionally or multidimensionally (called PAEs in the text which follows) and/or communicative/peripheral modules (IO) which are connected to one another either directly or by one or more bus system(s). PAEs are arranged in any design, mixture and hierarchy. This arrangement will be called PAE array or PA in the further text.

The conventional type of these chips includes systolic arrays, neuron networks, multiprocessor systems, processors having a number of arithmetic logic units and/or logic cells, networking and network chips such as e.g. crossbar switches and also known chips of the conventional FPGA, DPGA, XPUTER etc. type. Particular reference is made in this context to the following patents by the same applicant: P 44 16 881.0-53, DE 197 81 412.3, DE 197 81 483.2, DE 196 54 846.2-53, DE 196 54 593.5-53, DE 197 04 044.6-53, DE 198 80 129.7, DE 198 61 088.2-53, DE 199 80 312.9, PCT/DE 00/01869, DE 100 36 627.9-33, DE 100 28 397.7, DE 101 10 530.4, DE 101 11 014.6, PCT/EP 00/10516, EP 01 102 674.7, each of which is expressly incorporated herewith by reference in its entirety.

It should also be noted that the methods can also be applied to groups of a number of chips.

SUMMARY

A number of methods and hardware implementations are presented which may enable VPU systems to be efficiently debugged.

Debugging may take place either by using a microcontroller appropriately connected to a VPU or by a loading logic as described in U.S. Pat. No. 5,943,242 (PACT01), U.S. Pat. No. 6,424,068 (PACT02), U.S. Pat. No. 6,088,795 (PACT04), U.S. Pat. No. 6,021,490 (PACT05), U.S. Ser. No. 09/598,926 (PACT09), U.S. Ser. No. 09/623,052 (PACT10), U.S. Ser. No. 09/967,847 (PACT11), U.S. Ser. No. 10/009,649 (PACT13), (PACT17), each of which is expressly incorporated herewith by reference in its entirety.

DETAILED DESCRIPTION

Figure 1:
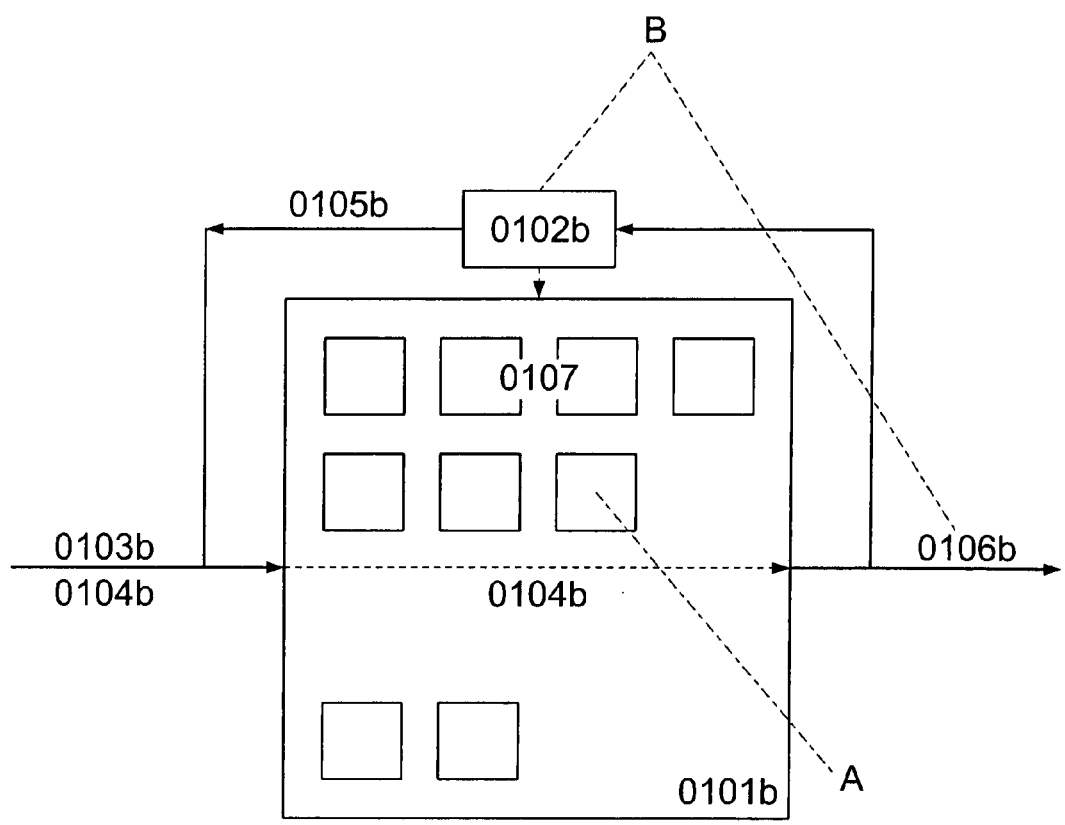
FIG. 1b illustrates a representation of an example embodiment of the finite state machine by a reconfigurable architecture.

Example Embodiment of Detection of a Debugging Condition

The programmer may specify, for example within the debugging tool, one or more conditions which start the debugging. The occurrence of the conditions may be determined at run time in the VPU. This may take place due to the occurrence of particular data values at particular variables and/or particular trigger values at particular PAEs.

Example Embodiment of Detection of a Debugging Condition—Precondition

In this example embodiment, a particular condition according to the abovementioned definition may be established by the programmer a number of clock cycles before the occurrence of the debugging condition. This may eliminate latency problems which will be discussed in the text which follows.

In the text which follows, two fundamental types of debugging for VPUs will be discussed, the method which may be employed in each case may depend on the choice of compiler:

For compilers which generate code on the basis of instanced modules of a hardware description language (or similar language), method A may be particularly suitable and will be described in the text which follows.

For compilers similar to PACT11 which generate complex instructions in accordance with a method similar to VLIW, method B may be particularly suitable and will be described in the text which follows.

Example Embodiment of Method A—Basic Principle

After the occurrence of a (pre)condition, the VPU may be stopped. After that, the relevant debugging information may be transferred from the PAEs to the debugging program. The relevant debugging information may have previously been established by the programmer in the debugging program. After all relevant debugging information has been read out, the next clock cycle may be executed and the relevant debugging information may be read out again. This may be repeated until the programmer terminates the debugging process.

Method A—Example Embodiment of Support by the Hardware—Reading Out the Registers One factor for the operation of the debugger is the possibility for the CT or another processor connected externally (called debugging processor (DB) in the text which follows) to read back in the internal data registers and/or status registers and/or state registers, and if possible, depending on implementation, other relevant registers and/or signals from the PAEs and/or the network (collectively known as debugging information in the text which follows). Such a possibility may be implemented, for example, with the connection between the loading logic and the data bus of a PAE created in U.S. Pat. No. 6,081,903 (PACT08/PCT) (PACT08/PCT 0403, FIG. 4).

It should be expressly noted that serial methods may also be used for reading out the registers. For example, JTAG may be selected and DB may also be connected, if necessary, as external separate device via this method.

Method A—Example Embodiment of Support by the Hardware—Stopping or Slowing Down the Clock Due to the occurrence of a condition and/or precondition, the clock may either be stopped or slowed down in order to provide sufficient readout time. This beginning of debugging may be triggered either directly by a PAE which calculated the (pre)condition(s) or by a loading logic due to any actions, for example due to the information that a (pre) condition occurred at a PAE and/or due to an action within the debugging processor and/or by any program and/or any external/peripheral source. To provide information, trigger mechanisms according to U.S. Pat. No. 5,943,242

(PACT01), U.S. Pat. No. 6,425,068 (PACT02), U.S. Pat. No. 6,081,903 (PACT08), U.S. Ser. No. 09/623,052 (PACT10), (PACT12), (PACT17) are available.

If the clock is slowed down, all relevant debugging information may need to be read out of the PAEs by the debugging processor within the slowed-down cycle of the processing clock.

If the clock is stopped, a single-step mode may be produced, i.e. the debugging processor may stop the processing clock until it has read out all debugging information. After that, it may restart the processing clock for one cycle and stop it again until all relevant debugging information has been read out.

The readout clock and the clock of the debugging processor may be independent of the processing clock of the PAEs so that the data processing is separate from the debugging and particularly the reading out of the debugging information.

With respect to the hardware, the stopping or slowing down of the clock may be achieved by conventional methods, such as, for example, gated clocks and/or PLLs and/or dividers or other methods.

Method A—Example Embodiment of Support by the Hardware—Register Pipeline for Compensating for Latency At higher operating frequencies, latency may occur between the detection of the beginning of debugging and the stopping or slowing down of the clock. This latency may be precisely predetermined since the position of the delaying registers in the VPU may be defined by hardware and/or the algorithm to be debugged and may, therefore, be calculated precisely by the debugger.

However, the latency may shift the information provided to the debugging processor, in such a manner that it is no longer possible to read out the correct debugging information.

By inserting a multistage register pipeline which may transmit the debugging information in each clock cycle further by one register, the debugging processor may refer back to the same number of clock cycles of debugging information as the register pipeline is long.

Due to the precise calculability of the latency, the debugging program may now read out the relevant debugging information of the correct time from the register pipeline.

Method A—Example Embodiment of Visible Debugging Information

In this method, debugging may take place after the occurrence of the (pre)condition since it is may be only after that that the clock may be slowed down or stopped and the debugging information may be read out. Debugging information from before the occurrence of the (pre)condition may not be visible initially.

However, it is possible, although with the loss of operating performance, to operate a VPU with a slowed-down clock or a single-step mode right from the start of an application. The relevant debugging information may be read out by the debugging processor from the start.

Example Embodiment of Method B—Basic Principle

Relevant debugging information from the memory units which, according to U.S. Pat. No. 5,943,242 (PACT01), U.S. Pat. No. 6,088,795 (PACT04), U.S. Ser. No. 10/009,649 (PACT13), U.S. Ser. No. 09/967,847 (PACT11), (PACT18), contain the application data and states of a particular operating step, may be transmitted to the debugging program. In the machine model of U.S. Pat. No. 5,943,242 (PACT01), U.S. Pat. No. 6,088,795 (PACT04), U.S. Ser. No. 09/967,847 (PACT11), U.S. Ser. No. 10/009,649 (PACT13), (PACT18), these memory units may operate as registers for storing data which has been calculated in the PA or parts of the PA within a configuration cycle. A memory unit may consist of an arbitrary arrangement and hierarchy of independent and dependent memories. It is possible to execute simultaneously a number of different algorithms on the PA which then use different memories.

For the application of this method that data and/or algorithmically relevant states may need to be stored in the memory units associated with the PAEs. A memory unit may be in each case dimensioned at least in such a manner that all relevant data and/or states of a cycle may be stored; the length of a cycle may be determined by the size of the memory unit.

Different data and/or states may be stored in the memory units in such a manner that they may be unambiguously correlated with the algorithm. As a result, the debugger may unambiguously identify the relevant data and/or states (debugging information).

The relevant debugging information may have been previously specified by the programmer within the debugging program. This debugging information may be read out of the memory units. Different methods are available for this and some possibilities will be described in greater detail in the text which follows. After all relevant debugging information has been read out, the next configuration cycle may be executed and the relevant debugging information may be read out again. This may be repeated until the programmer/debugger terminates the debugging process.

In other words, the relevant data and/or status information may be transmitted to the debugger configuration by configuration rather than clock cycle by clock cycle. This may occur from the memory units which are comparable to the registers of a CPU.

Example Embodiment of Method B—Support by the Hardware

A factor for the operation of the debugger may be the possibility for the CT or any other processor connected externally (called debugging processor (DB) in the text which follows) to read the, for example, also internal, memory unit of the VPU. Such a possibility may be given, for example, by the CT being connected to the memories for preloading and reading the data and/or by the methods for writing the internal memories to external memories, described in PACT13. Memory (units) may be accessed by the debugging processor by various conventional methods (e.g., shared memory, bank switching).

According to the method A, the clock for reading out the memories may be either correspondingly slowed down, if necessary, or stopped and generated in single-step mode. In this arrangement, special intervention in the clock may be omitted depending on the implementation of the memories, e.g., in the case of the bank switching method. According to method B, stopping or slowing down the clock and reading out and/or copying and/or switching of the memory unit may be done only when a data processing cycle or configuration cycle has ended.

Example Embodiment of Method B—Access to Debugging Information

In U.S. Pat. No. 5,943,242 (PACT01), U.S. Pat. No. 6,088,795(PACT04), U.S. Ser. No. 09/967,847 (PACT11), U.S. Ser. No. 10/009,649 (PACT13), data processing methods are described in which a set of operations may be cyclically mapped to a reconfigurable data processing chip. In each cycle, a plurality of data may be calculated which originate from a peripheral source and/or an internal/external memory and are written to a peripheral source and/or an internal/external memory. In this arrangement, different and/or, above all, a number of independent memories may be used simultaneously in each case.

In other words, the memory units or a part of the memory units may be used as register set in this data processing method.

According to U.S. Ser. No. 09/967,847 (PACT11) and U.S. Ser. No. 10/009,649 (PACT13), all data and states which may be relevant for the further data processing may be stored in the memory units or read out of these. States which may be irrelevant for the further data processing need not be stored.

The distinction between relevant and irrelevant states may be demonstrated in the following example and reference is made to PACT11:

The state information of a comparison may be essential, for example, for the further processing of the data since it determines the functions to be executed.

A sequential divider may be produced, for example, by mapping a division instruction onto a hardware which only supports sequential division. This may produce a state which identifies the computing step within the division. This state may be irrelevant since only the result (i.e. the division performed) is required for the algorithm. In this case, therefore, only the result and the time information (i.e. the availability) may be needed.

The time information may be obtained, for example, by the RDY/ACK handshake in the VPU technology of U.S. Pat. No. 5,943,242 (PACT01), U.S. Pat. No. 6,425,068 B1 (PACT02), U.S. Ser. No. 10/009,649 (PACT13). However, it may be noted in this respect that the handshake may not represent a relevant state, either, since it may only signals the validity of the data as a result of which the remaining relevant information may be again reduced to the existence of valid data.

A distinction between locally and globally relevant states is demonstrated in U.S. Ser. No. 09/967,847 (PACT11) as follows:

Local: the state is only relevant within a single completed configuration. For this reason, it is not mandatory to store the state.

Global: the state information is needed for a number of configurations. The state may need to be stored.

It is now possible that the programmer wants to debug a locally relevant state which is not stored in the memories. In this case, the application may need to be modified to the extent that a debugging configuration may be produced (equivalent to the debugging code of processors) which exhibits a modification of the "normal" code of the application in such a manner that this state may be additionally written into the memory unit and may be thus provided to the debugger.

Example Embodiment of Method B—Visible Debugging Information

Debugging before the (pre)condition may be comparatively simple and may be performed without great performance losses since the debugging information needed may be available in memories. The debugging information may be saved simply by copying the memories into other memory areas. An even faster method may be to switch the memories by means of a (conventional) bank switching method between the individual configurations in such a manner that the debugging information may be located in a new bank in each case. The switching may be done in a very time-optimizing manner, even without effect on the processing performance in the optimum case.

In contrast to method A, irrelevant states may be picked up only with difficulty since they need not be stored (according to U.S. Ser. No. 09/967,847 (PACT11). In special cases, however, they may be additionally stored within the debugging code similar to the locally relevant states, and/or a method may be used in which method A and B are used jointly.

However, it should be mentioned that there does not appear to be any requirement for storing this information in the VPU technology according to U.S. Pat. No. 6,425,068 B1 (PACT02). It is only when programmable sequences according to U.S. Ser. No. 10/009,649 (PACT13) are used instead of the SM unit U.S. Pat. No. 6,425,068 B1 (PACT02), that it may be useful to debug irrelevant states.

Example Embodiment of Operation of the Debugger

The debugger program itself may run on a DB outside the PA. The debugging information may be read by the debugger according to method A or B and stored in a memory and/or memory area separate from the data processing. The debugger program may define the breakpoints and (pre)conditions. The debugger program may also take over control of the execution of the application, particularly the start of execution and the end of execution.

The debugger according to the invention may also communicate with other tools and particularly also debuggers according to U.S. Ser. No. 09/967,498 (PACT20) within a development environment, as a result of which the control and definition of the debugging parameters may be taken over from another debugger. Similarly, the debugger may provide the debugging information generated by it to another debugger or obtain from the latter its debugging information.

The determination of the occurrence of breakpoints and/or (pre)conditions, in particular, may be performed by another debugger from the units debugged by this other debugger. The debugger according to the invention and the VPU may then respond correspondingly.

Evaluation of the Methods

Method A may be considerably more time- and resource-intensive than method B in which hardly any additional hardware may be required and moreover the time-consuming reading out of the debugging information from the start of the application may possibly be omitted. Method B may, therefore, be preferred in principle. However, applications which are formed by the compilation of normal HDL source codes onto a VPU may be scarcely suitable for applying method B. For compilers according to PACT11, however, method B must be clearly preferred.

Figure 2:
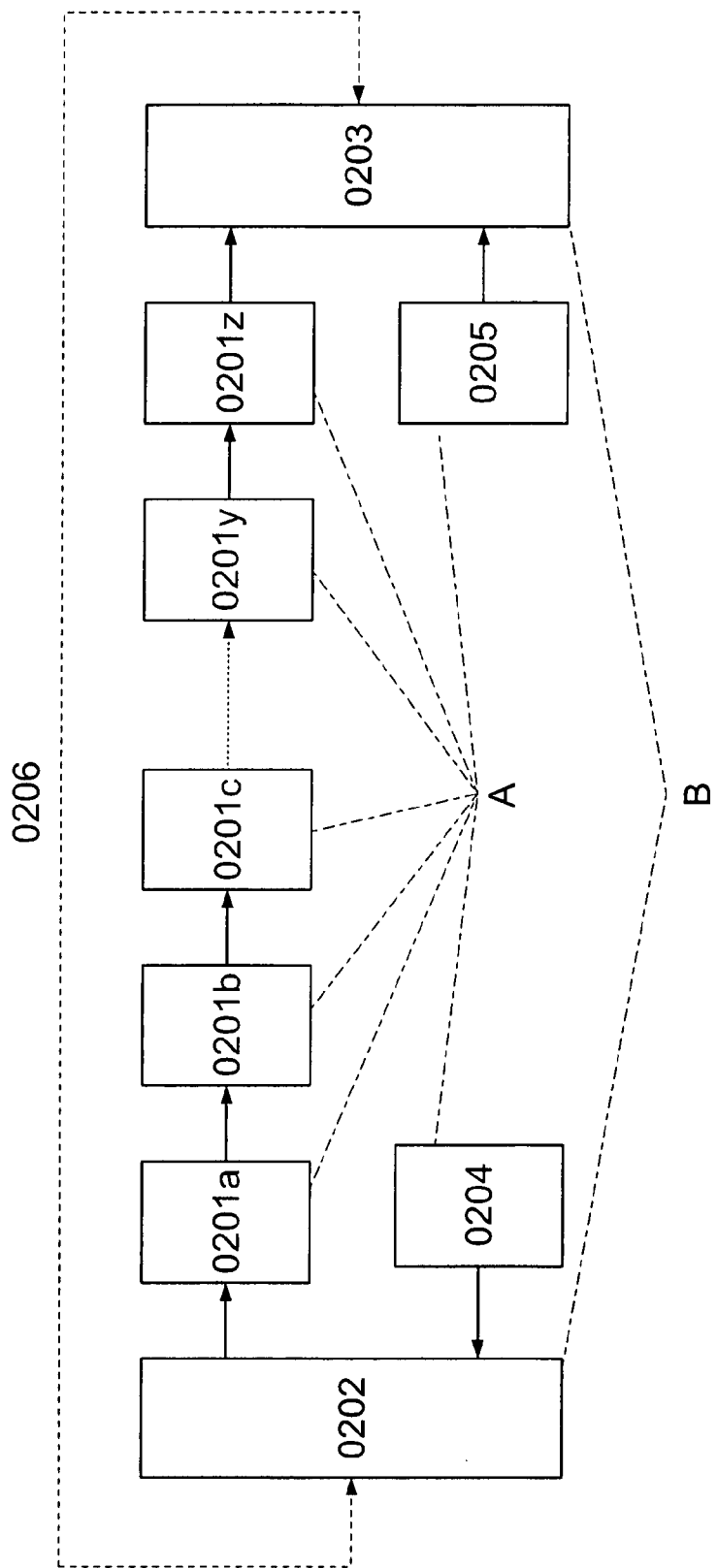
FIG. 2 illustrates an example embodiment of the mapping of a finite state machine onto a reconfigurable architecture.

FIGS. 1 and 2 may be associated with patent application PACT11. The different approaches of methods A and B have been drawn into the figures (A, B).

FIG. 1*b* illustrates a representation of an exemplary embodiment of the finite state machine by a reconfigurable architecture according to U.S. Pat. No. 5,943,242 (PACT01) and U.S. Pat. No. 6,088,795 (PACT04) (PACT04, FIGS. 12-15). The combinatorial network of FIG. 1*a* (0101) is replaced by an arrangement of PAEs 0107 (0101*b*). The register (0102) may be executed by a memory (0102*b*) which may store a number of cycles. The feedback according to 0105 may be done by 0105*b*. The inputs (0103*b* and 0104*b*, respectively) are equivalent to 0103 and 0104, respectively. The direct access to 0102*b* may be implemented by a bus by the array 0101*b*. The output 0106*b* is again equivalent to 0106.

FIG. 2 illustrates an example embodiment of the mapping of a finite state machine onto a reconfigurable architecture. 0201(x) represents the combinatorial network (which can be designed as PAEs according to FIG. 1b). There may be one or more memories for operands (0202) and one or more memories for results (0203). Additional data inputs/outputs according to 0103b, 0104b, 0106b are not shown for the sake of simplicity. The memories may be in each case associated with an address generator (0204, 0205).

The operand and result memories (0202, 0203) may be physically or virtually coupled to one another in such a manner that, for example, the results of a function of one another may be used as operands and/or results and operands of a function of one another may be used as operands. Such coupling may be established, for example, by a bus systems or by a (re)configuration in accordance with which the function and networking of the memories with the 0201s may be reconfigured.

Figure 3:
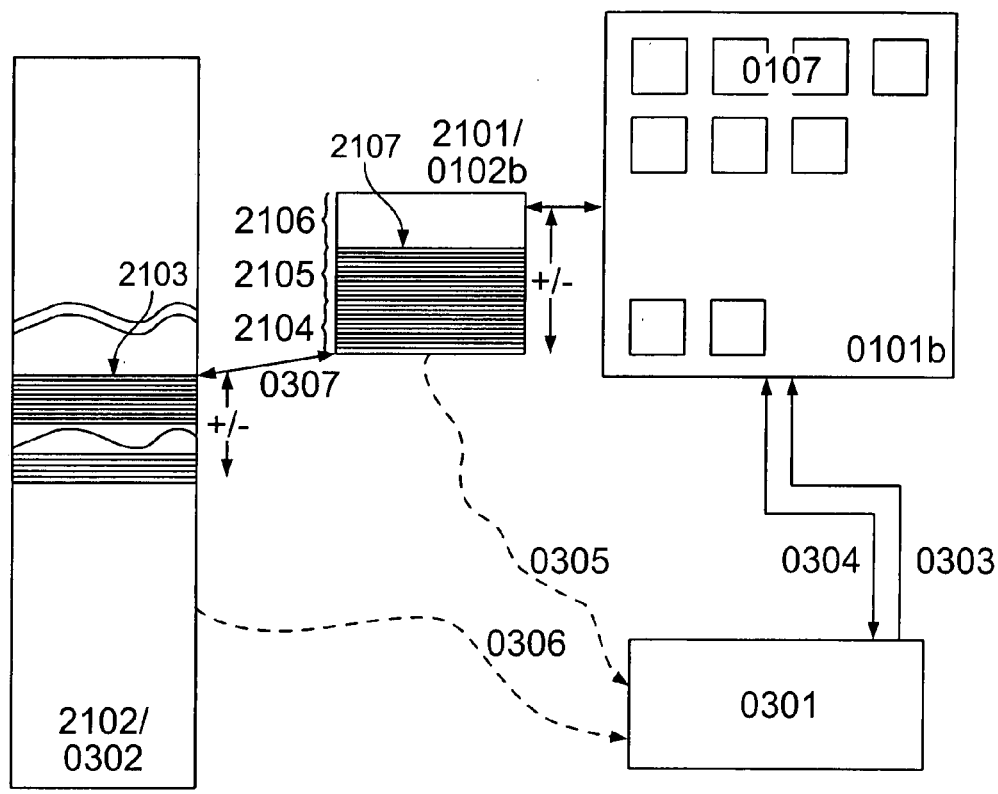
FIG. 3 illustrates an example embodiment of a diagrammatic structure of the debugging according to method B.

FIG. 3 illustrates an example embodiment of a diagrammatic structure of the debugging according to method B. Reference is made to FIGS. 19, 20, 21 of patent application U.S. Pat. No. 6,038,650(PACT13) in which the principle of the memories is described. U.S. Pat. No. 6,038,650 (PACT13) is herewith incorporated to its full extent.

0101b and 0102b are illustrated as already described. In addition, an external memory unit is shown (0302) which may possibly be connected (0307) to 0102b similar to U.S. Pat. No. 6,038,650 (PACT13). Reference is made to the fact that both 0102b and 0302 may be external or internal memory units. Similarly, a memory unit may need to be defined as at least one register, a set of registers or a memory (RAM, flash, hard disk or similar).

The debugging unit 0301 may set breakpoints within 0101b (0303) on the basis of which the actual debugging process may be triggered. When a breakpoint is reached, an information item (0304) may be sent to 0301 which starts the debugging process; at the same time, all provisions for debugging internal to 0101b, (e.g. stopping and/or slowing down of the clock) may be triggered. As an alternative, information may also be generated by 0301 and sent to 0101b. 0301 may access the data and/or states from the memory 0102b and/or the memory 0302 via 0305 and/or 0306. The accessing may be done, for example, by 1. shared memory (block move, i.e. copying the memories into another area controlled by 0301)
2. a line (serial or parallel line via which one or more memory area(s) may be transmitted, e.g. JTAG)
3. bus couplings of any type (the memories may be arbitrated similar to a DMA method and processed by 0301).

As an example, a figure from U.S. Ser. No. 10/009,649 (PACT13) has been selected. Reference is made to the fact that, in principle, every memory method and every shared memory (stack, random access, FIFO etc.) May be correspondingly processed.

The invention claimed is:

1. A method for efficiently debugging a program defining a plurality of configurations to be successively processed on a dynamically reconfigurable architecture including a plurality of logic elements cooperating with each other, the method comprising:

storing data in a memory in a configuration-conforming manner, the data generated by executing a configuration forming part of the program on the reconfigurable architecture, and including algorithmically relevant state data of the program that is associated with at least one of the configurations;

subsequently continuing execution of the program, the execution including a reconfiguration;

detecting an error based on stored state data, wherein for each state for which corresponding state data is to be stored, the state remains unchanged at least until the corresponding state data is stored;

for obtaining a particular state data, interrupting execution of the program by configuring a first configuration via which the particular state data is transmitted to a debugging unit instead of a second configuration that is a next-required configuration of the program; and subsequent to obtaining the particular state data, resuming execution of the program by configuring the second configuration.

2. The method according to claim 1, wherein the memory includes an internal memory of the dynamically reconfigurable architecture in which the state data is stored.

3. The method according to claim 1, wherein the data are stored in an external memory and the state data relate to a state of the reconfigurable architecture after linking of operands.

4. The method according to claim 1, wherein the data includes state data that is associated with a configuration processed when the data is stored and that is not required following termination of the configuration.

5. The method according to claim 1, wherein debugging information is read out by a dedicated debug configuration, and normal program execution continues subsequent to the reading out of the debugging information.

\* \* \* \* \*